Nov. 20, 1956     T. C. TAYLOR     2,771,323
STANDPIPE FLOW CONTROLS
Filed Feb. 20, 1953     2 Sheets-Sheet 1
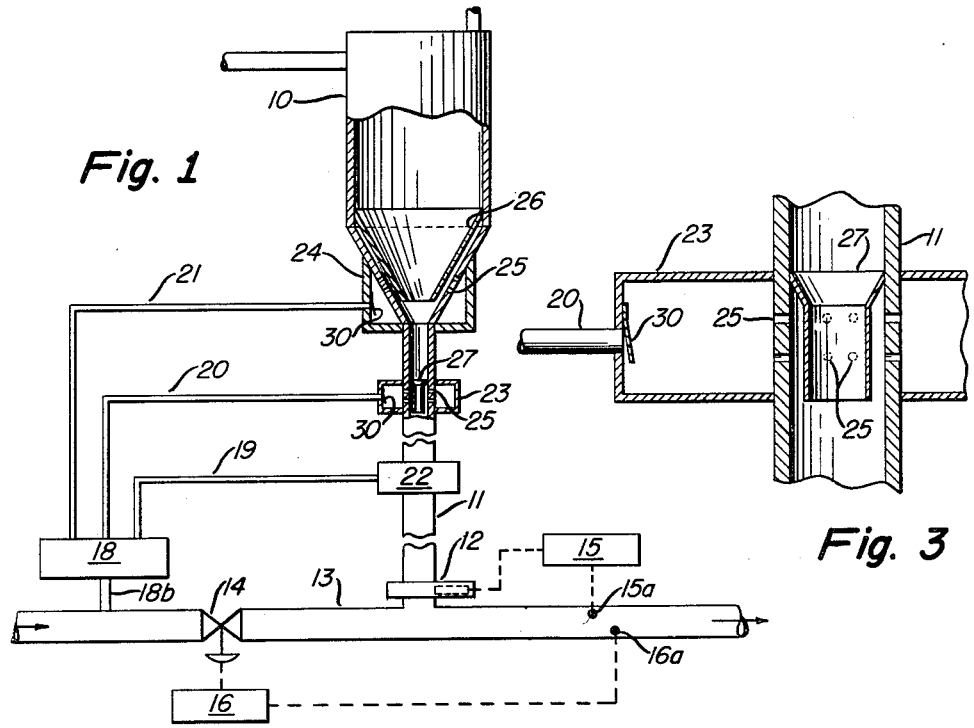
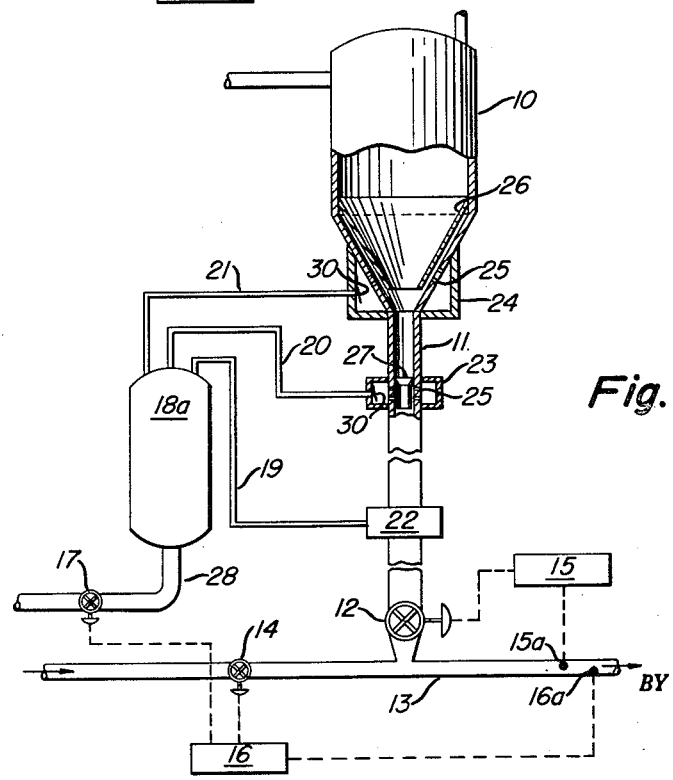
INVENTOR.
Theodore C. Taylor
BY Everett A. Johnson
ATTORNEY United States Patent Office 2,771,323
Patented Nov. 20, 1956

2,771,323
STANDPIPE FLOW CONTROLS

Theodore C. Taylor, Columbus, Ohio, assignor to Standard Oil Company, Chicago, Ill., a corporation of Indiana Application February 20, 1953, Serial No. 337,917

13 Claims. (Cl. 302—57)

The present invention relates to a system for the control of continuous flow of fluidized solids from a standpipe.

It is well known that finely divided solid materials may be caused to flow by proper aeration with air or any other gas or vapor. A solid so aerated seeks its own level and exerts a "hydrostatic" pressure in any process where it is desired to flow a continuous stream of a fluent solid from a hopper or other vessel. In many cases it is necessary to withdraw the solid into a conduit or vessel against a pressure. For example, it is often desired to transport the withdrawn solid from a standpipe for an appreciable distance by means of a carrier gas or vapor. In such cases difficulties may arise due to the fact that even a momentary reversal of the pressure differential across the valve which controls the flow may result in an upset. Furthermore, since the density of the fluidized solid is relatively low compared to a true liquid, long standpipes may be required to obtain the desired pressuring head and the solids in such standpipes may bridge.

An object of the invention is to provide a method and means for control of fluidized solids flow in standpipes which is self-compensating and automatic. Another object of the invention is to provide a method and means for control of fluidized solids from a standpipe which can be combined with or coupled with other automatic controls to insure more steady, safe and accurate control of the flow. A further object of the invention is to provide a method and means of control which is responsive to conditions remote from the standpipe and which increases the general utility of standpipes for inducing flow of finely divided solids.

The control system of my invention can be best illustrated and described in connection with a hopper, standpipe, and transfer line of the type used in fluidized catalyst systems for the catalytic conversion of hydrocarbons. It is to be understood, however, that the control system is also applicable to other flow systems where a fluid is continuously introduced into a transfer line under a hydrostatic head produced by the finely divided solids and introduced by a control valve into a space wherein fluctuations in the pressure are possible.

In a system of this general type, the hydrocarbon to be treated is introduced into the bottom of a fluidized catalyst reactor as a carrier gas for finely divided solid catalyst which is concurrently introduced into the reactor. The finely divided catalyst in the reactor is continuously recycled through a regenerator to burn off carbonaceous deposits. Intermediate the reactor-regenerator and regenerator-reactor are provided a hopper and standpipe arrangement discharging into a transfer line. Thus, the finely divided catalyst is continuously withdrawn from a hopper into a standpipe and from the standpipe through a control valve into a transfer line where the solids are picked up and carried in suspension to the reactor or regenerator.

The control system described is applicable to any standpipe-transfer line apparatus wherein a continuously replenished column of fluent solids is withdrawn from a hopper or other vessel and introduced by the "hydrostatic" head into a transfer line. This principle includes controlling the flow through an adjustable orifice at the base of the standpipe in response to changes in the pressure in the transfer line downstream of the standpipe, as well as the control of introduction of pressuring gas at spaced points in the standpipe in response to such pressure changes.

Thus, I have devised an arrangement whereby solids can be fed from a stationary or fluidized bed by aiding gravity feed in the transport system. The invention will be better understood by referring to the accompanying drawing which schematically illustrates the features of the apparatus used.

Referring to the drawings:

Figures 1 and 2 are elevations showing forms of the overall apparatus;

Figure 3 is an enlarged fragmentary section schematically illustrating the details of the jackets and shields;

Referring to the apparatus, a bed of finely divided solids is maintained in chamber 10 and solids are withdrawn downwardly from a low point in the chamber 10 via a standpipe 11 through the valve 12 into the transfer line 13. Experience with the gravity flow of dense phase solids through an ordinary standpipe indicates that the flow of solids sometimes stops due to bridging of the solids within the standpipe. Complete stoppage of flow may occur, particularly in small equipment, in those operations where the valve 12 is in a nearly closed position.

It is known that the pressure in the suspended stream of gases and solids in the transfer line 13 at the point downstream of the standpipe 11 is dependent upon solids flow rate in the standpipe 11, other factors in the process being constant. According to my invention, selected control elements such as solids valve 12 and carrier gas valve 14 in transfer line 13 are governed by this pressure.

Figure 4:
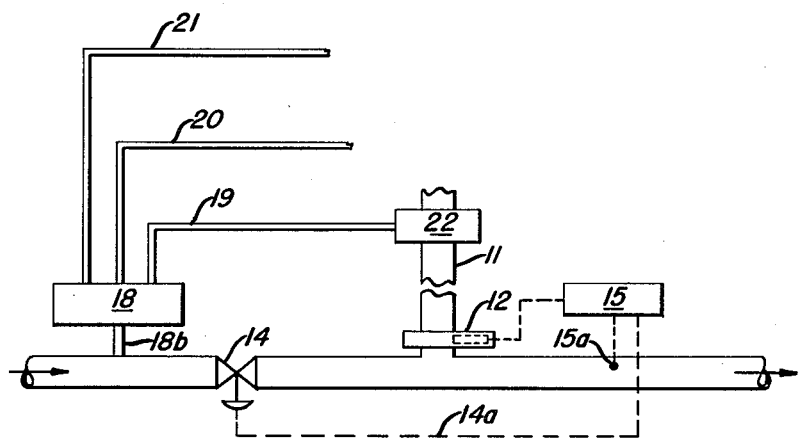
Figure 4 is a fragmentary schematic showing of another embodiment of the invention.

The pressure sensitive control means 15 controls the valve 12 in the standpipe 11 and a similar control means 16 positions throttle valve 14 and pressurizing gas valve 17 (Figure 2 only). It is contemplated that, as shown in Figure 4, the pressure controller 15 may actuate valve 14 and impulse line 14a is provided for this purpose.

In the event that the flow of solids from the standpipe 11 is stopped or reduced by bridging, there is a consequent reduction in the pressure downstream at 15a. This causes controller 15 to open valve 12 wider and controller 16 to begin to close valve 14. The partial closing of throttle valve 14 causes increased pressure in the upstream pressure tap chamber 18. This chamber is provided as a pressurized reservoir and communicates through separate lines 19, 20 and 21 with the standpipe jackets 22, 23 and 24 respectively. The standpipe jackets 22, 23 and 24 in turn communicate through a number of perforations or ports 25 with the interior of the standpipe 11 and the conical bottom of the vessel 10.

Within the vessel 10 is provided a false conical bottom 26. The pressurizing gas ports 25 open to the annular space provided between the inner wall of the standpipe 11 and the outside of the shields 27. These shields 27 and the false conical bottom 26 prevent flow of solids from the ports back into the standpipe jackets and deflect the flow of pressurizing gas generally downwardly into the standpipe 11.

The increased pressure developing in the pressurized reservoir 18 is applied via the associated lines 19 and 20 to the jackets 22 and 23 if the solids of the system are blocking the standpipe below the respective jackets. When this is the case, the pressure builds up in the jackets until sufficient to blow out the solids which bridge the standpipe 11 and hinder flow downwardly therethrough. The same action takes place at the base of the vessel 10 through jacket 25 and conical shield 26. Thus, in the event that solids are not plugging the standpipe 11 in the region of the lower standpipe jackets 22 and 23, the action of the upper jacket 24 at the base of the vessel 10 will blow the solids loose. When the standpipe 11 itself is not clogged, the flows through conduits 19 and 20 are so proportioned as to give a high pressure drop for large air flows. This will permit sufficient pressure in the upper jacket 24 to blow the bottom of the bed loose.

The jackets 22, 23 and 24 and the pressurizing chamber 18 are all of size sufficient to prevent great lowering of pressure in all of them when one of the jackets blows loose the solids blocking it. A similar result might be obtained in the absence of the pressurizing chamber 18 through the use of a suitable check valve such as a cantilever check or "feather" valves 30 at the inlets to jackets 22, 23 and 24 as indicated in Figure 3. These feather valves 30 operate as check valves and serve to regulate the pressure drop across any one jacket or the system of jackets.

As loading of solids downstream of the standpipe 11 is restored the pressure at 15a increases and the valve 12 and throttle valve 14 return to their original settings. Likewise, any overloading of solids within the transfer line 13 causes the valve 12 to close somewhat thereby tending to restore the initial selected pressure conditions and solids concentration in the transfer line 13.

The system can be adapted for use where the presence of ordinary transport gas in the standpipe is an explosion hazard. For example, when separate catalyst is transferred from a reactor to a regenerator and the normal transfer gas is combustion air, the diversion of the transfer gas to pressurize the standpipe as described above might not be desirable. However, the use of a separate source of pressurizing gas enables one to utilize the principle of my invention. If desired, such separate source of pressurizing gas may be a gas which is inert in the system and may, for example, be a stream of a stripping gas.

In Figure 2 of the drawings, I have illustrated another embodiment of the invention wherein a separate pressurizing gas supply is introduced by line 28 and valve 17. This separate source of pressure is regulated to maintain constant pressure sufficient to provide controlled aeration in the standpipe 11 and whenever blocking occurs as described above, the restoring action for the flow of solids in the standpipe 11 would be as described. Otherwise, the operation of the system is similar to that described above. Other changes may be made in the apparatus. For example, in the case of a short standpipe 11 only the jacket corresponding to 24 might be needed whereas for a long standpipe more jackets than illustrated in the drawings might be desirable.

Figure 5:
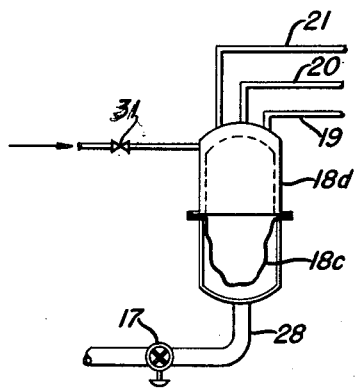
Figure 5 is a fragmentary schematic elevation showing of another form of the pressure reservoir and associated lines.

Another embodiment of my invention is illustrated in Figure 5 and comprises a system wherein the reservoir 18d (corresponding to 18 or 18a, of Figures 1 and 2) is provided with a displaceable partition 18c such as a diaphragm or piston and a check valve 31 near the discharge or upper end of the reservoir whereby a gas in the reservoir is displaced therefrom through the conduits 19, 20 and 21 when gas flow occurs in lines 18b or 28 as described above in connection with Figures 1 and 2. Such a system can beneficially be used to apply pulsating or intermittent force through a pressurizing gas to the solids in the standpipe and avoids introduction of carrier gas into the standpipe. The check valve 31 opens upon restoration of the initial pressure relationship and admits additional gas to be displaced in the succeeding cycle.

Although I have described forms of apparatus in some detail, which may be used with my invention, it is to be understood that these are by way of illustration only and that changes and modifications may be made therein by those skilled in the art in view of my disclosure without departing from the spirit of the invention.

What I claim is:

1. A system for transferring fluidized solids by means of a standpipe and a transfer line containing a carrier gas which includes a transfer line, a standpipe for fluent solids extending downwardly from a vessel and discharging into said transfer line, a control valve in said standpipe, a first pressure-sensitive controller downstream of said standpipe and actuated by pressure in said transfer line to operate said control valve, a throttle valve on said transfer line upstream from said standpipe, a second pressure-sensitive controller on said transfer line downstream of and operating said throttle valve, a pressurizing reservoir in pressure communication with said transfer line upstream of said throttle valve, a plurality of vertically spaced jackets about ports in said standpipe, and a plurality of conduits communicating between said pressurizing reservoir and said vertically spaced jackets on said standpipe.

2. The system of claim 1 wherein a gas diversion flow line extends between said transfer line and said pressurizing reservoir.

3. A system for transferring fluidized solids by means of a vertically extending standpipe and a laterally extending transfer line containing a carrier gas which includes an elevated vessel, a transfer line, a standpipe for fluent solids extending downwardly from said vessel and discharging into said transfer line, a control valve in said standpipe near the base thereof, a first pressure-sensitive controller actuated by pressure in said transfer line downstream of said standpipe and operating said control valve, a throttle valve on said transfer line upstream from said standpipe, a second pressure-sensitive controller on said transfer line downstream of said throttle valve and operating said throttle valve, a pressurizing reservoir, a separate conduit for supplying pressurizing gas to said reservoir, a flow valve on said conduit operated in response to the second pressure-sensitive controller on said transfer line, a plurality of conduits communicating between said pressurizing reservoir and vertically spaced points on said standpipe, and valve means at said spaced points for establishing a pressure drop between said spaced points along said standpipe.

4. The system of claim 1 wherein a movable partition means in said reservoir displaces gas therefrom.

5. A system for transferring fluidized solids by means of a standpipe into a transfer line which includes a standpipe for fluent solids extending from the bottom of a vessel and discharging into said transfer line, a control valve in said standpipe, a first pressure-sensitive controller connected to said transfer line downstream of said standpipe to actuate said control valve, a throttle valve upstream from said standpipe in said transfer line, a second pressure-sensitive controller adapted to actuate said throttle valve and responsive to pressure changes in said transfer line downstream of said throttle valve, a pressurizing reservoir, a flow line communicating with said reservoir and said transfer line upstream of said throttle valve, a plurality of vertically spaced jackets about ports in said standpipe and a plurality of conduits communicating between said pressurizing reservoir and vertically spaced jackets on said standpipe.

6. An apparatus for the gravity transfer of fluent finely divided solids in a column from an elevated chamber comprising in combination an elevated solids accumulation chamber, a standpipe extending downwardly from said chamber and in free-flowing communication therewith, a transfer line disposed below said chamber and communicating with the base of said standpipe, a valve means for controlling the flow of finely divided solids from said standpipe into said transfer line, a throttle valve on said transfer line upstream of said standpipe, a first pressure-sensitive controller connected to said transfer line downstream of said standpipe, said pressure controller actuating said valve in said standpipe, a second pressure-responsive controller connected to and responsive to said pressure in said transfer line downstream of said standpipe, said second controller actuating said throttle valve, a pressurizing surge chamber in flow communication with said transfer line upstream of said throttle valve, a series of port means at vertically spaced points along said standpipe, and gas flow conduits extending between said pressurizing chamber and discharging into said port means whereby a throttling of said throttle valve in response to pressure decrease in said transfer line bypasses transfer gas through said pressurizing chamber into and downwardly through said standpipe to remove any bridging obstruction therein.

7. A system for flowing fluidized solids into a transfer line which includes a vertical conduit for fluent solids discharging into a transfer line, a control valve in said conduit, a pressure-sensitive controller actuated by pressure in said transfer line, an impulse line connected downstream of said conduit to said controller, said controller positioning said control valve, a second control valve upstream from said standpipe in said transfer line also operated by said pressure-sensitive controller, a pressurizing reservoir communicating with said transfer line upstream of said second valve, and a plurality of conduits communicating between said pressurizing reservoir and discharging into said standpipe at vertically spaced points.

8. An apparatus for the gravity transfer of fluent finely divided solids in a column from an elevated chamber comprising in combination an elevated solids accumulation chamber, a standpipe extending downwardly from said chamber and in free-flowing communication therewith, a flow control valve in said standpipe, a transfer line disposed below said chamber and adapted to receive the divided solids from said standpipe, a throttle valve on said transfer line upstream of said standpipe, a first pressure-sensitive controller connected to said transfer line downstream of said standpipe, said pressure controller actuating said valve in said standpipe, a second pressure-responsive controller responsive to said pressure in and connected to said transfer line, said second controller actuating said throttle valve, a pressurizing chamber, supply valve means controlling the flow of gas to said chamber, said supply valve means being actuated by said second controller, a series of port means at vertically spaced points along said standpipe, and gas flow conduits extending between said pressurizing chamber and said port means whereby in response to pressure decrease in said transfer line pressurizing gases flow into and downwardly through said standpipe to remove any bridging obstruction therein.

9. A system for transferring fluidized solids by means of a standpipe and a transfer line containing a flowing carrier gas which includes a storage vessel, a transfer line below said storage vessel, a standpipe for conveying fluent solids downwardly from said vessel and discharging into said transfer line, a control valve in said standpipe, pressure-sensitive controller means arranged downstream of said standpipe and actuated by pressure in said transfer line, throttle valve means on said transfer line upstream of said standpipe, a source of pressurizing gas within a chamber, a plurality of vertically spaced jackets about ports in said standpipe, and a plurality of conduits communicating between said pressurizing source and discharging into said vertically spaced jackets on said standpipe, said pressure-sensitive controller means being adapted to actuate said control valve and said throttle valve.

10. The system of claim 9 which includes a separate conduit means supplying a separate pressurizing gas to said chamber, a second throttle valve on said separate conduit, a separate pressure-sensitive controller connected to said transfer line downstream of said standpipe for controlling said throttle valve and said second throttle valve.

11. The system of claim 10 wherein the reservoir chamber is provided with a displaceable partition wherein the gas in the reservoir is displaced therefrom when pressurizing gas is introduced to the chamber through the said second throttle valve.

12. The system of claim 9 which includes a gas diversion flow line extending between said transfer line upstream of said throttle valve and discharging into said pressurizing gas chamber.

13. The system of claim 9 wherein said pressure-sensitive controller means comprises individual pressure-sensitive controllers for actuating said control valve and for actuating said throttle valve.

References Cited in the file of this patent
UNITED STATES PATENTS

| | | |
|---|---|---|
| 2,623,793 | Hill | Dec. 30, 1952 |
| 2,674,496 | Thayer | Apr. 6, 1954 |
| 2,676,142 | Crawley | Apr. 20, 1954 |
| 2,684,870 | Berg | July 27, 1954 |
| 2,705,216 | Drew | Mar. 29, 1955 |